(12) United States Patent
Ansari et al.

(10) Patent No.: US 8,904,468 B2
(45) Date of Patent: Dec. 2, 2014

(54) TELEVISION PRINTING DEVICE AND METHODS THEREOF

(75) Inventors: Ahmad C. Ansari, Cedar Park, TX (US); Pierre Costa, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 981 days.

(21) Appl. No.: 11/835,718

(22) Filed: Aug. 8, 2007

(65) Prior Publication Data
US 2009/0044243 A1 Feb. 12, 2009

(51) Int. Cl.
*H04N 7/173* (2011.01)
*H04N 7/16* (2011.01)
*H04N 21/4782* (2011.01)
*H04N 21/41* (2011.01)

(52) U.S. Cl.
CPC ........... *H04N 7/163* (2013.01); *H04N 21/4782* (2013.01); *H04N 21/4117* (2013.01)
USPC ........... 725/133; 725/110; 725/131; 725/100; 725/151

(58) Field of Classification Search
USPC ............................... 725/80, 133, 141, 153, 88
See application file for complete search history.

(56) References Cited

U.S. PATENT DOCUMENTS

| | | | |
|---|---|---|---|
| 6,871,926 B2 * | 3/2005 | Adkins et al. | 347/7 |
| 6,978,473 B1 * | 12/2005 | Nsonwu et al. | 725/52 |
| 7,016,595 B1 | 3/2006 | Ishino et al. | |
| 7,077,586 B2 | 7/2006 | Hisatomi | |
| 7,433,070 B2 * | 10/2008 | Koppich et al. | 358/1.15 |
| 2002/0069417 A1 * | 6/2002 | Kliger et al. | 725/78 |
| 2002/0144295 A1 * | 10/2002 | Hirata | 725/153 |
| 2004/0070689 A1 * | 4/2004 | Mochizuki et al. | 725/133 |
| 2004/0123314 A1 * | 6/2004 | Bova | 725/32 |
| 2005/0091700 A1 * | 4/2005 | Ohno et al. | 725/133 |
| 2005/0177853 A1 * | 8/2005 | Williams et al. | 725/81 |
| 2006/0023246 A1 * | 2/2006 | Vidyanand | 358/1.13 |
| 2006/0203285 A1 * | 9/2006 | Yamaguchi et al. | 358/1.15 |
| 2006/0238806 A1 * | 10/2006 | Karaoguz et al. | 358/1.15 |
| 2008/0021880 A1 * | 1/2008 | Ren et al. | 707/3 |

* cited by examiner

*Primary Examiner* — Nasser Goodarzi
*Assistant Examiner* — Fred Peng
(74) *Attorney, Agent, or Firm* — Guntin & Gust, PLC; Joseph P. Hrutka (57) ABSTRACT

A set-top box (STB) of a television system receives web-based content, such as a web page, from a wide area network such as the Internet. The web-based content is provided to the STB for display. In response to an instruction, the STB provides all or a portion of the web-based content to a printer for printing. The printer can be connected to the STB via a network or through a computer connected to the STB on the same network. By providing an option to print the web-based content, the usefulness of the content is enhanced.

11 Claims, 5 Drawing Sheets

TELEVISION PRINTING DEVICE AND METHODS THEREOF

FIELD OF THE DISCLOSURE

This disclosure generally relates to television systems and more particularly to set-top boxes for television systems.

BACKGROUND

Television viewing is a popular form of entertainment. Developments in television and video technologies allow viewers to watch a wide variety of high-resolution content and to record programs to watch at a convenient time. Recent advancements, such as video-on-demand and the expansion of available channels, add to the breadth and convenience of television programming. Further, additional services, such as web-based services, are becoming more available through television devices. With the introduction of new delivery networks such as Fiber To The Home (FTTH), Fiber To The Node (FTTN) and the use of Internet Protocol (IP), more and more IP-based and Web-based are becoming available to the consumers through the television. However, the same feature functionality that is available through a Personal Computer (PC) that is connected to an IP network or the Internet is not yet available through a television that is connected to a similar network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

A television system and methods thereof are disclosed. A set-top box (STB) of the television system receives web-based content, such as a web page, from a wide area network such as the Internet. The web-based content is provided to the STB for display. In response to an instruction, the STB provides all or a portion of the web-based content to a printer for printing. The printer can be connected to the STB via a network or through a computer connected to the STB. By providing an option to print the web-based content, the usefulness of the content is enhanced.

Figure 1:
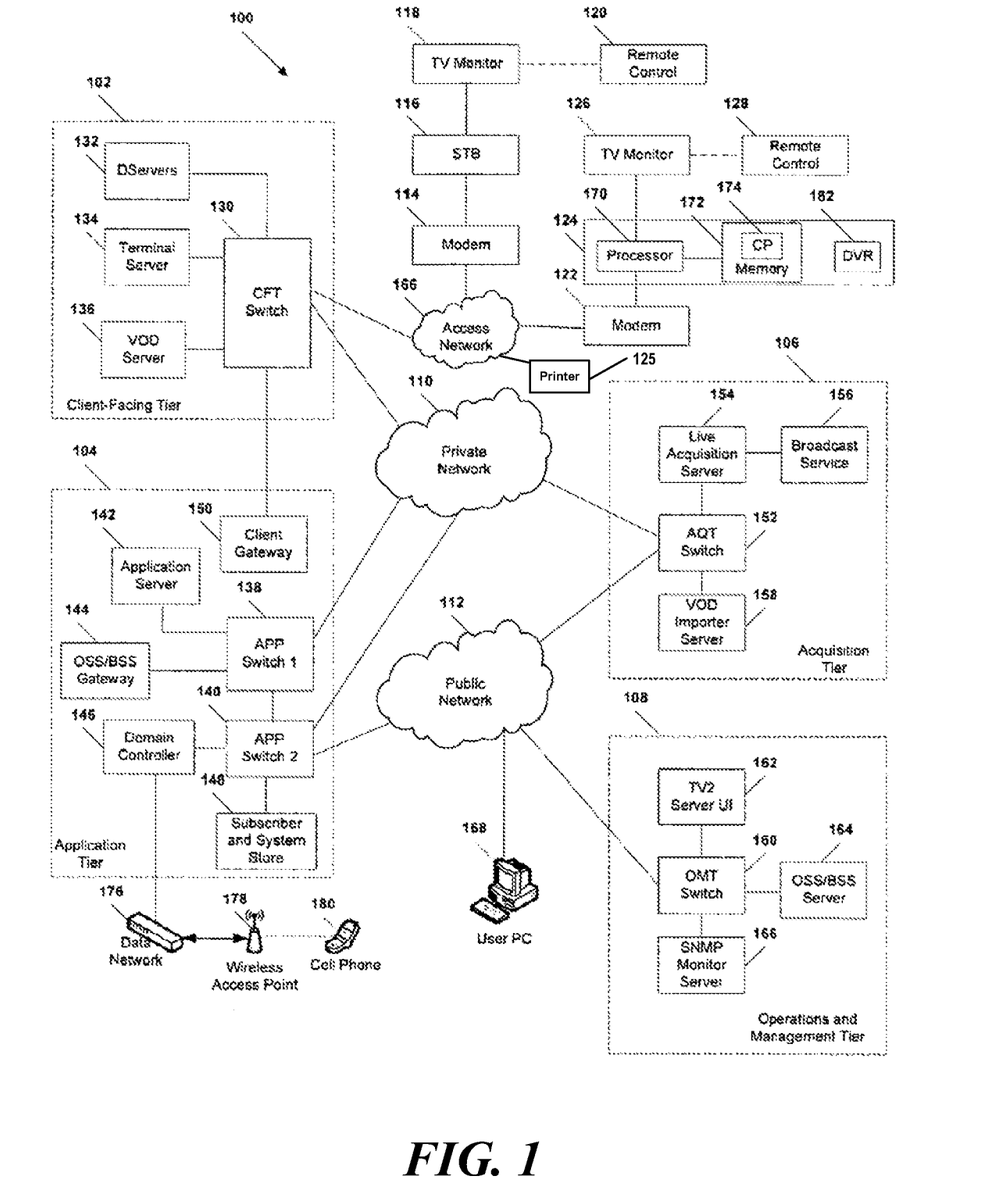
FIG. 1 is a block diagram illustrating a particular embodiment of an Internet protocol television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to a public network such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. In a particular embodiment, the first modem 114 and the second modem 122 are routers. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 180.

In a particular embodiment, the set-top box devices can include an STB computer program 174 that is embedded within the STB memory device 172. In a particular embodiment, the STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device such as the cellular phone 180. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular phone 180. In an illustrative embodiment, the status can be sent via a wireless access protocol (WAP). Further details of the IPTV system are taught in U.S. Patent Application Publication No. 2007/0083895, the disclosure of which is hereby incorporated by reference.

The STB 124 can also receive interactive data such as web pages, from the public network 112 and display the web pages at the television monitor 126. A user can interact with the web pages, including selecting links, enter address information, and the like, via the remote control 128 or a wireless keyboard (not shown). In response to the user interaction, the STB 124 can request additional interactive data from the public network 112. For example, when a user selects a particular link on a web page displayed at the television monitor 126, the STB 124 can request a web page associated with the selected link.

In addition, the STB 124 can provide a print option to user to print received interactive data. The print option can be provided via a graphical user interface (GUI), a button or other input device at the remote control 128, an input device at a wireless keyboard, via a button or other input device at the STB 124, and the like. In response to selection of the print option, the STB 124 sends the data to be printed to the printer 125. In response, the printer 125 prints the data.

By providing an option to print web pages and other interactive data, the STB 124 enhances the utility of the interactive data. For example, some web pages provide travel information, such as reservation information, schedule information, and the like. By allowing such information to be printed, the STB 124 enhances the convenience with which a user can interact with these web pages. Online shopping pages would be similarly enhanced.

In one embodiment, in response to selection of the print option, the STB 124 invokes a printer driver stored at the set-top box. The printer driver communicates with the printer 125 via the home network 166 or other local area network in order to print the data. The printer driver can be pre-loaded at the STB 124, or can be retrieved by the STB 124 via the public network 112.

In another embodiment, the printer 125 is connected to a personal computer, such as the personal computer 168. In response to selection of the print option, the STB 124 sends the data to be printed to the personal computer, which provides the data to the printer 125 for printing. Once the data has been printed, the personal computer can send a message to the STB 124 to indicate that printing is complete. In response, the STB 124 can display information at the television monitor 126 to indicate printing is completed. The STB 124 can display additional information at the television monitor 126 in response to messages from the personal computer, such as messages to indicate printing progress, messages to indicate a printer error, messages to indicate the particular document that is being printed, and the like.

In another embodiment, the STB 124 can provide the data to be printed to the modem 122. In this configuration the modem 122 can be a router or residential gateway that stores a printer driver for the printer 125. The modem 122 sends the properly formatted data to be printed directly to the printer 125 or to a personal computer connected to the printer 125 in order to print the data.

The STB 124 can display other information while data is being printed at the printer 125. For example, the STB 124 can display video programming at the television monitor 126 while data is printed at the printer 125. Messages associated with the printing, such as error messages or print completion messages can be displayed as an overlay of the video programming. Thus, a user can print web page or other information while watching television programs, movies, or other content, thereby enhancing the user experience of the television system.

Figure 2:
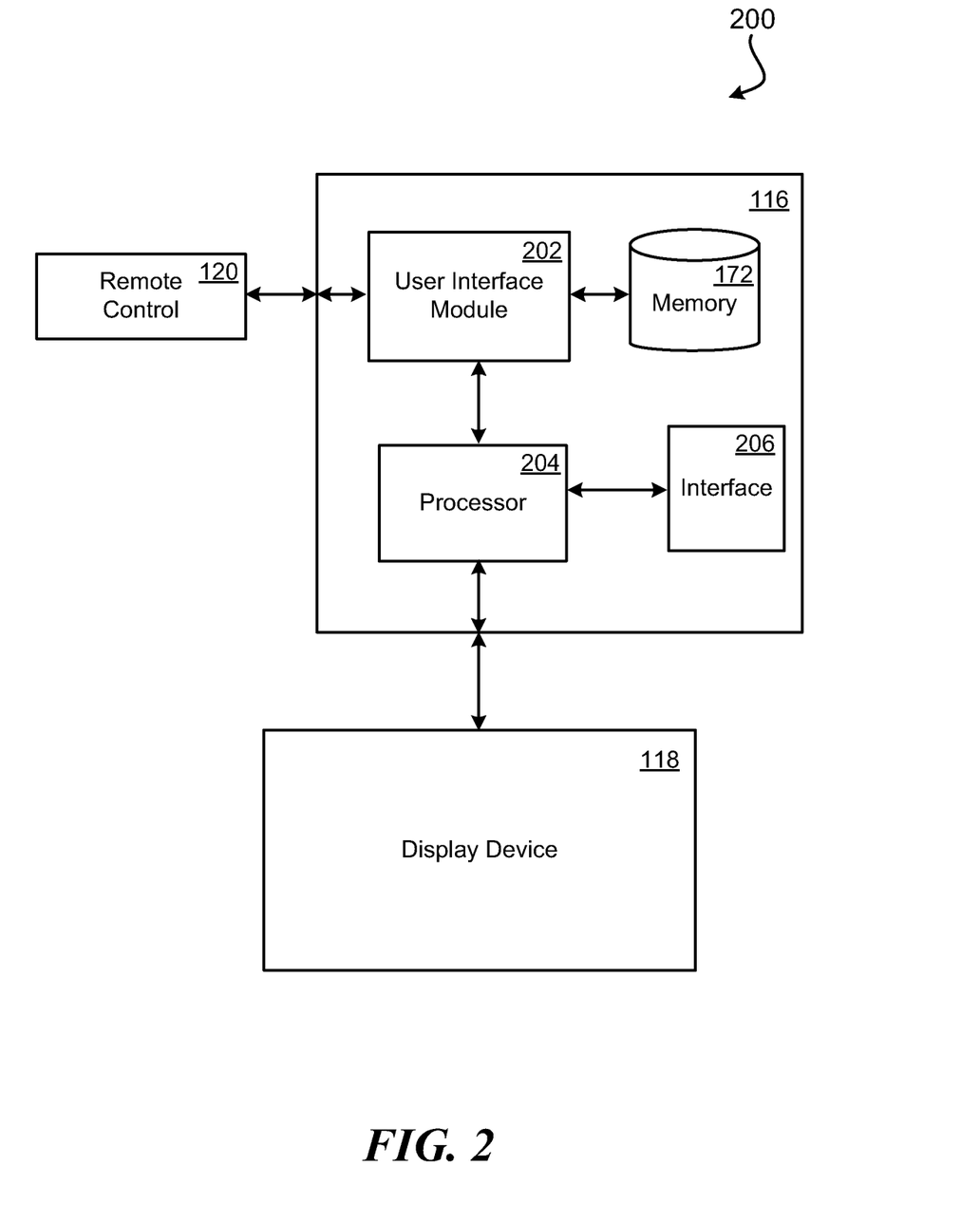
FIG. 2 is a block diagram of a particular embodiment of a television system.

FIG. 2 shows a block diagram of a television system 200 including a video receiver such as the set-top box 116, the television monitor 118, and the remote control 120. The set-top box includes the memory 172, a user interface module 202, a processor 204, and an interface 206. The user interface module 202 is coupled to the memory 172 and the processor 204. The processor 204 accesses the memory 172 to retrieve information stored in the memory by the user interface module 202. The interface 206 is configured to receive data from the home network 166, including interactive data and television content.

The user interface module 202 receives a control stimulus from a user of the remote control 120 to indicate that a web page or other interactive data displayed at the television monitor 118 should be printed. The data to be printed can be stored on the memory 172 for later home by the processor 204. In response to the indication that the data should be printed, the processor 204 retrieves the data to be printed stored in the memory 172 and provides it to the printer 125 via the interface 206.

Figure 3:
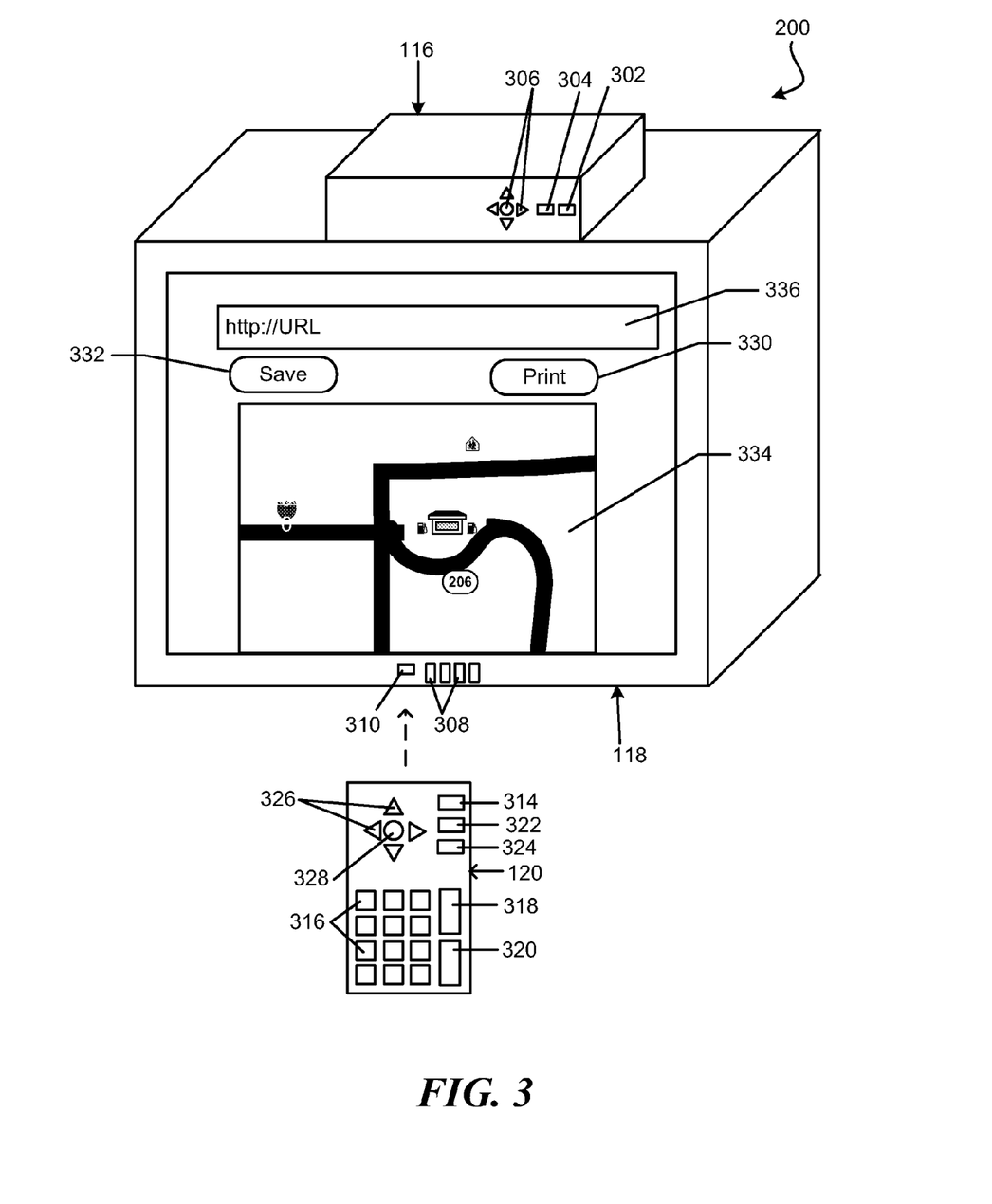
FIG. 3 is a block diagram of a particular embodiment of a graphical user interface of the television system of FIG. 2.

FIG. 3 shows an embodiment of the television system 200 including the set-top box 116, the remote control 120, and the display device 118. The exterior of the set-top box 116 includes a sensor 302, a power button 304 and a plurality of control buttons 306. The display device 118 is preferably a television including a plurality of control buttons 308, a sensor 310, and a display screen 312. The remote control 120 is preferably a remote control including a power button 314, a plurality of number buttons 316, a channel select button 318, a volume select button 320, a guide button 322, an event button 324, a plurality of control buttons 326, and a select button 328.

The sensor 302 of the set-top box 116 receives control stimulus from an external device, such as the remote control 120 or a wireless keyboard (not shown), and controls the set-top box based on the control stimulus received. The power button 304 of the set-top box 116 allows a user to turn the set-top box on or off, and the control buttons 306 allow the user to perform necessary operations on the set-top box. In a particular embodiment, one of the control buttons 306 provides an option to print interactive data, such as web page data, at a printer. The power button 314 on the remote control 120 allows a user to turn different devices on and off, such as the display device 118 and the set-top box 116. A user is able to enter the number of a particular channel with the plurality of number buttons 316. The channel select button 318 allows the user to increment or decrement the channel displayed on the display screen 312, and the volume select button 320 changes the volume outputted from the display device 118. The guide button 322, the event button 324, the plurality of control buttons 326, and the select button 328 perform a variety of control operations with the set-top box 116 which are discussed below.

The control buttons 308 of the display device 118 preferably include a power button, a channel button, a select button, and a menu button. The control buttons 308 allow the user to change the channel displayed on the display screen 312 and the volume of the audio from the display device 118 without the aid of an additional device such as the remote control 120. The display screen 312 is able to display video signals from various sources such as the set-top box 116, a digital video disc (DVD) player, and an analog antenna. The sensor 310 receives control stimulus from an external device and controls the display device 118 based on the control stimulus received.

The display device 118 can display video content, such as broadcast television programs, movies, and the like, and also display interactive content. In the illustrated example of FIG. 3, the display device 118 displays a graphical user interface (GUI) that displays web content 334, a print option 330, a save option 332, and an address bar 336. A user can interact with the GUI with the remote control 120 or with a wireless keyboard. For example, the remote control 120 can be used to select the save option 332 by using the control buttons 326 or by pointing a cursor controlled by the remote control 320 at the save option 332 and pressing the select button 328. In response to selection of the save option, the STB 116 can save the web content 334, either locally or at another device connected to the home network 166. Further, the remote control 120 or a wireless keyboard can be used to enter web address or universal resource locators (URLs) in the address bar 336. In response to entry of the URL, and pressing the select button 326, the STB 116 can retrieve web page information associated with the URL from the public network 112 and display the information at the display device 118. In response to selection of the print option 330, the STB 116 can provide the web content 334 to the printer 125 for printing. The STB 116 can provide a portion of the web content 334, all of the content, or modified content. For example the STB 116 can print the web content 334 with additional information, such as the URL associated with the content, with the time of the printout, and other information. Further, the remote control 120 can be used to select a portion of the web content 334 for printing. The STB 116 identifies the selected content and provides it to the printer for printing.

In addition, one of the control buttons 326 of the remote control 120 can be a print button. In response to pressing or selection of this button, the STB 116 can provide the appropriate interactive information to the printer 125 for printing.

Figure 4:
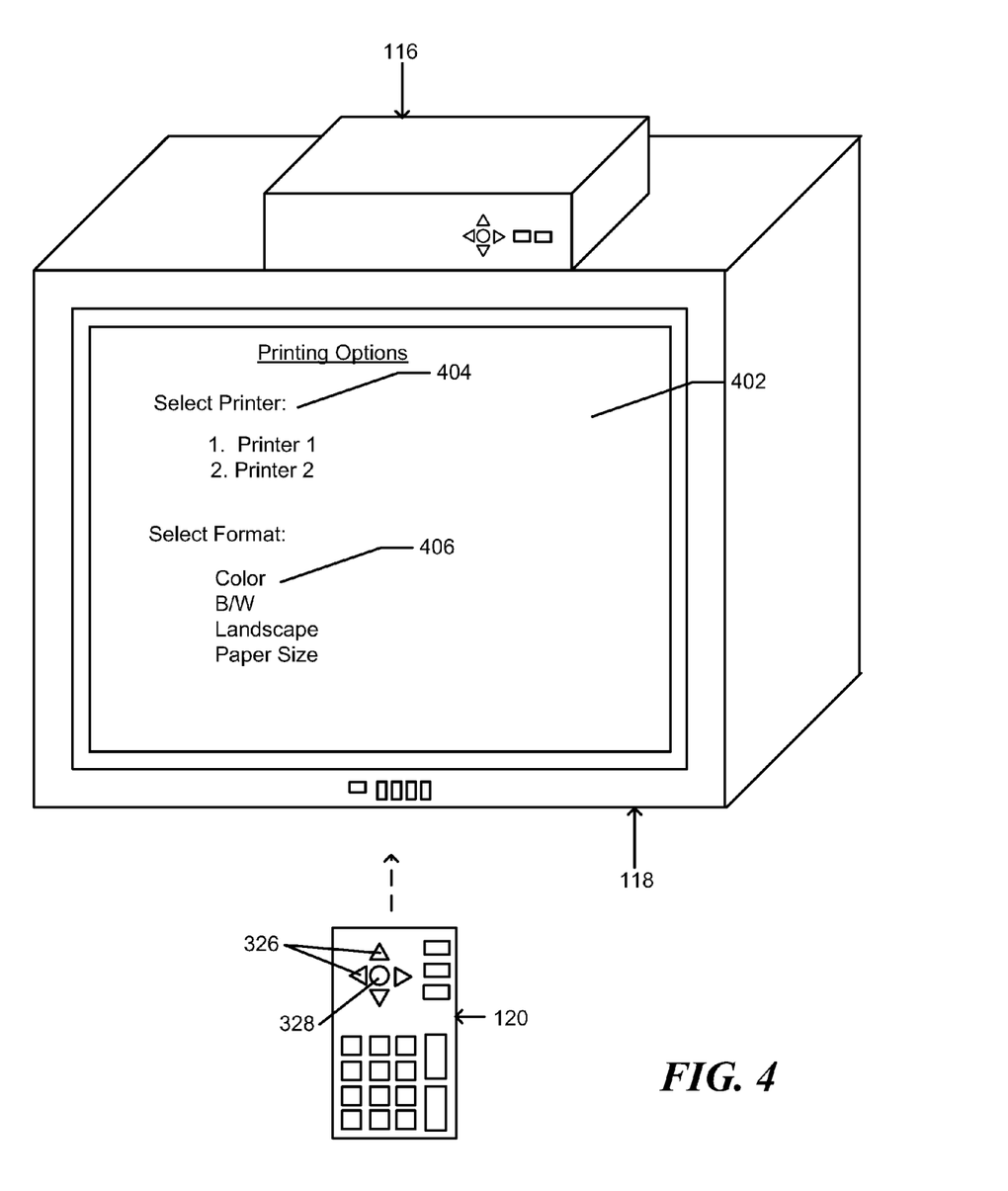
FIG. 4 is a block diagram of an alternative embodiment of a graphical user interface of the television system of FIG. 2.

FIG. 4 shows a graphical user interface (GUI) 402 displayed on display device 118. The GUI 402 includes printer selection options 402 and print format options 406. The options can be selected by a user via the remote control 120. For example, the control buttons 326 and the select button 328 can be used to highlight and select particular options. Alternatively, the remote control 120 can be used to control a cursor displayed at the display device 118. The cursor can highlight particular options and the select button 328 used to select a particular option With respect to the printer selection options 402, the STB 116 can be connected to multiple printers. For example, more than one printer can be connected to the home network 166, and the STB 116 can be configured to have access to all or a subset of these printers. The STB 116 provides a list of the printers to the television monitor 118 for display as the printer selection options 402. In response to the user selecting a particular printer for printing, the STB 116 stores the selected in printer. When interactive data is selected for printing, the STB 116 provides the data to the selected printer to be printed.

The print format options 404 can display a variety of print options including a color format (e.g., color or black and white printing), a print resolution, paper selection, paper size, printing orientation (e.g. landscape printing), paper tray selection, and the like. As options are selected by a user via the remote control 120 or other input device, the STB 116 stores the appropriate print format information. When data is selected to be printed, the STB 116 provides the appropriate format information to the selected printer. Accordingly, a user can print web pages or other interactive information to a number of different printers in a number of different formats, enhancing the utility of the interactive data.

Figure 5:
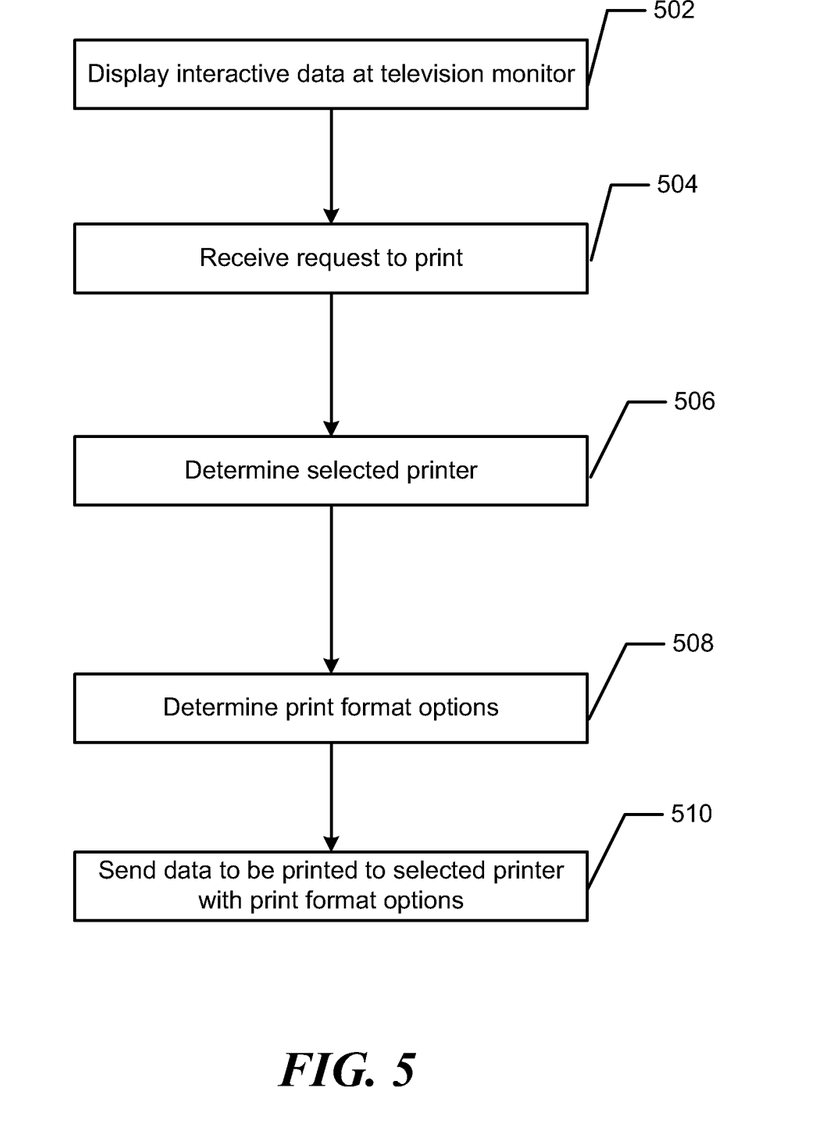
FIG. 5 is a flow chart of a method to send data from a monitor to a printer.

Referring to FIG. 5, a flow diagram of a particular embodiment of a method of providing interactive data from an STB to a printer is illustrated. At block 502, the STB displays interactive data, such as a web page by providing the data to a television monitor. Proceeding to block 504, the STB receives a request to print. The request to print can be received from a remote control device, for example via an indication that a print button on the remote control has been pressed, by an indication that a displayed print option has been selected, and the like.

At block 506, in response to receiving the request to print, the STB determines which printer of a plurality of printers has been selected for printing. The STB can display a list of printers at the television monitor in response to the request and determine which of the list of printers is selected. Alternatively, the STB can access stored information indicating which printer is selected for printing. This allows a user to store a default selected printer, and have the STB print to the default printer unless instructed otherwise.

Proceeding to block 508, the STB determines print format options, such as color format, page size, page orientation, and the like. To determine the print format options the STB can display a list of options at the television monitor and determine which options are selected. Alternatively, the STB can access stored information indicating which format options should be implemented.

Moving to block 510, the STB provides the data to be printed to the selected printer, together with control information indicating the print format options for the data. The data and other information can be provided to the printer via a local area network, via a direct connection with the STB, via a router, or via a computer device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
    associating an subscriber account with a set-top box through a network, wherein the set-top box is coupled to a television monitor, wherein the set-top box communicates with a computer device associated with the subscriber account through the network;
    receiving viewing preferences for the set-top box from the subscriber account;
    receiving first information associated with a first web page content, wherein the first information is received at the set-top box according to the viewing preferences associated with the television monitor, wherein the first web page content is displayed on the television monitor with other media content from the set-top box;
    receiving instructions based user interaction with the first web page content, wherein the instructions comprise one of a selected link, an subscriber address, a request to access to second web page content, a selection of a portion of the first information, or any combination thereof to create second web page content;
    receiving a request to print associated with the second web page content;
    receiving a printer driver from the network;
    storing the printer driver on the set-top box;
    providing second information from the set-top box for display at the television monitor, wherein the second information comprises a list of a plurality of print format options comprising print resolution, paper selection, printing orientation, and paper tray selection;
    receiving a selection of a first print format option from the list of the plurality of print format options; and
    sending instructions from the set-top box to a printer via the network, wherein the instructions comprise the second web page content and an identification of the first print format option and wherein sending the instructions comprises invoking the printer driver;
    receiving a request to save associated with the second web page content;
    responsive to receiving the request to save, saving second web page content to the computer device associated with the subscriber account through the network;
    receiving at the set-top box print status information from the computer device;
    displaying the print status information as an overlay on the television monitor; and
    providing the media content from the set-top box to the television monitor while displaying the print status information, sending a representation of the second web page content to the printer for printing, wherein the printer communicates with the set-top box through the network.

2. The method of claim 1, wherein the request to print is received from a remote control device.

3. The method of claim 1, wherein the computer device is coupled to the set-top box via a local area network.

4. The method of claim 1, comprising sending instructions from the set-top box to a printer comprises sending the instructions to a first router coupled to the printer.

5. The method of claim 1, further comprising receiving the media content at the set-top box via a first input coupled to a wide area network, and wherein the information associated with the first web page is received via the first input.

6. The method of claim 1, wherein the status information indicates a print error.

7. The method of claim 1, wherein providing the second information comprises providing the second information for display as another overlay on the television monitor.

8. A set-top box, comprising:
    a memory to store instructions; and
    a processor coupled to the memory, wherein responsive to executing the instructions, the processor performs operations comprising:
        associate a subscriber account with a set-top box through a network, wherein the set-top box is coupled to a television monitor, wherein the set-top box communicates with a computer associated with the subscriber account through the network;
        receive viewing preferences for the set-top box from the subscriber account;
        provide television content and web page content based upon web page content and the viewing preferences to a television monitor for display;
        receive instructions based user interaction with the web page content, wherein the instructions comprise one of a selected link, an subscriber address, a request to access to content of another web page, a selection of the web page content, or any combination thereof to create updated web page content receive a print request associated with a selected portion of the updated web page content;

responsive to receiving the print request, receive a printer driver from the network and store the printer driver on the set-top box;

receive a request to save associated with the selected portion of the updated web page content; and responsive to the received save request, store the selected portion of the updated web page content at a network device provide print option information from the set-top box for display at the television monitor, wherein the print option information comprises a list of a plurality of print format options comprising print resolution, paper selection, printing orientation, and paper tray selection;

receive a selection of a first print format option from the list of the plurality of print format options; and send instructions from the set-top box to a printer via the network, wherein the instructions comprise the selected portion of the updated web page content and an identification of the first print format option and wherein sending the instructions comprises invoking the printer driver;

receive print status information from the computer at the set-top box;

display the print status information as an overlay on the television monitor; and provide the television content from the set-top box to the television monitor while displaying the print status information and while sending the instructions to the printer.

9. The set-top box of claim 8, wherein the updated web page content includes a URL of the web page content.

10. The set-top box of claim 8, wherein the updated web page content includes a time of day that the selected portion of the web content is sent to the printer.

11. A method, comprising:

associating a subscriber account with a set-top box through a network, wherein the set-top box is coupled to a television monitor, wherein the set-top box communicates with a computer associated with the subscriber account through the network;

sending first information associated with first web page content to a television monitor for display;

receiving instructions based user interaction with the first web page content, wherein the instructions comprise one of a selected link, an subscriber address, a request to access to second web page content, a selection of the first web content, or any combination thereof to create second web page content;

sending second information associated with a graphical user interface to the television monitor for simultaneous display with second web page content, the graphical user interface including graphical information indicating a print option and a save option;

receiving a selection of a portion of the second web page content;

receiving from the graphical user interface an indication that the print option has been selected;

providing second information from the set-top box for display at the television monitor, wherein the second information comprises a list of a plurality of print format options comprising print resolution, paper selection, printing orientation, and paper tray selection;

receiving a selection of a first print format option from the list of the plurality of print format options;

responsive to the received indication that the first print option has been selected, sending a representation of the selection of the portion of the second web page content to a printer for printing based on the selected first print format option;

receiving from the graphical user interface an indication that the save option has been selected; and responsive to the received indication that the save option has been selected, storing the selection of the portion of the second web page content at a network device receiving at the set-top box print status information from the computer;

displaying the print status information as an overlay on the television monitor; and providing media content from the set-top box to the television monitor while displaying the print status information.

\* \* \* \* \*